Dec. 7, 1965   H. V. ELLIOTT   3,222,472
TURN SIGNAL SWITCH FOR A TILTABLE STEERING WHEEL
Filed Nov. 19, 1962   3 Sheets-Sheet 3
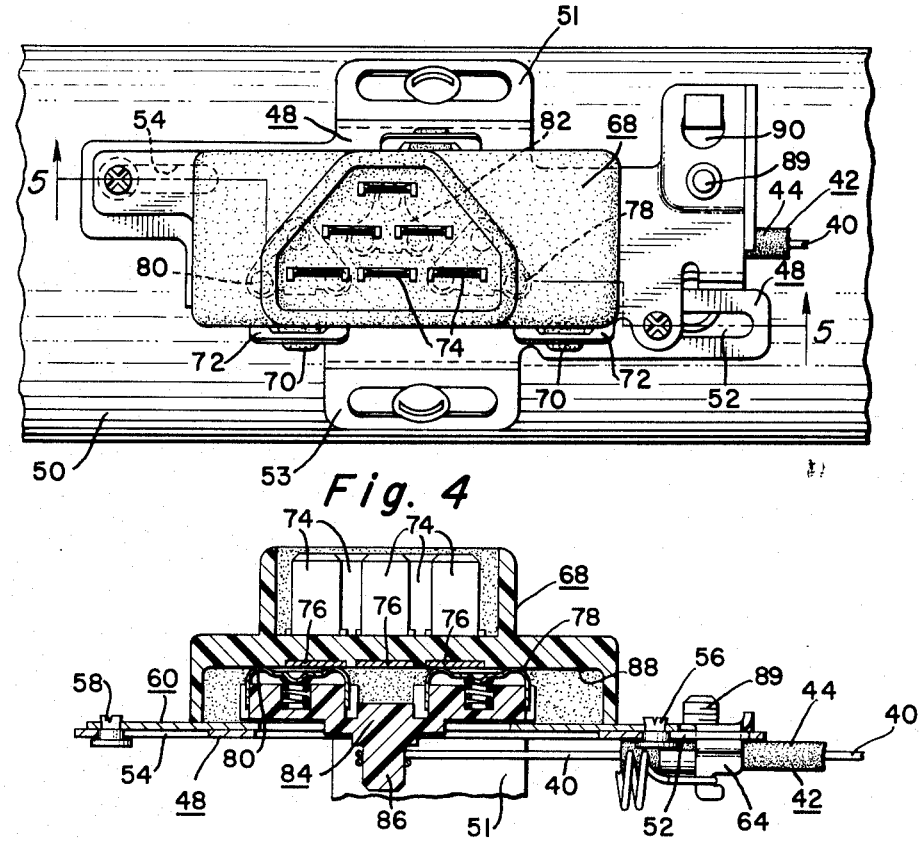
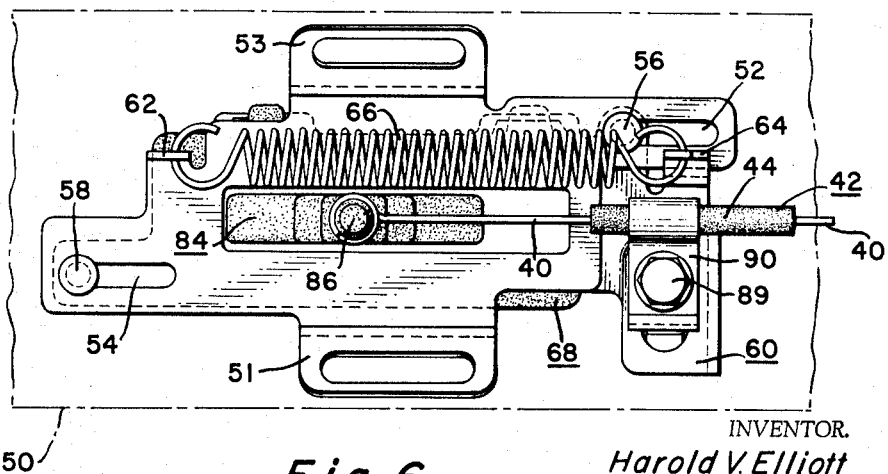
INVENTOR.
Harold V. Elliott
BY C. R. Meland
His Attorney United States Patent Office 3,222,472
Patented Dec. 7, 1965

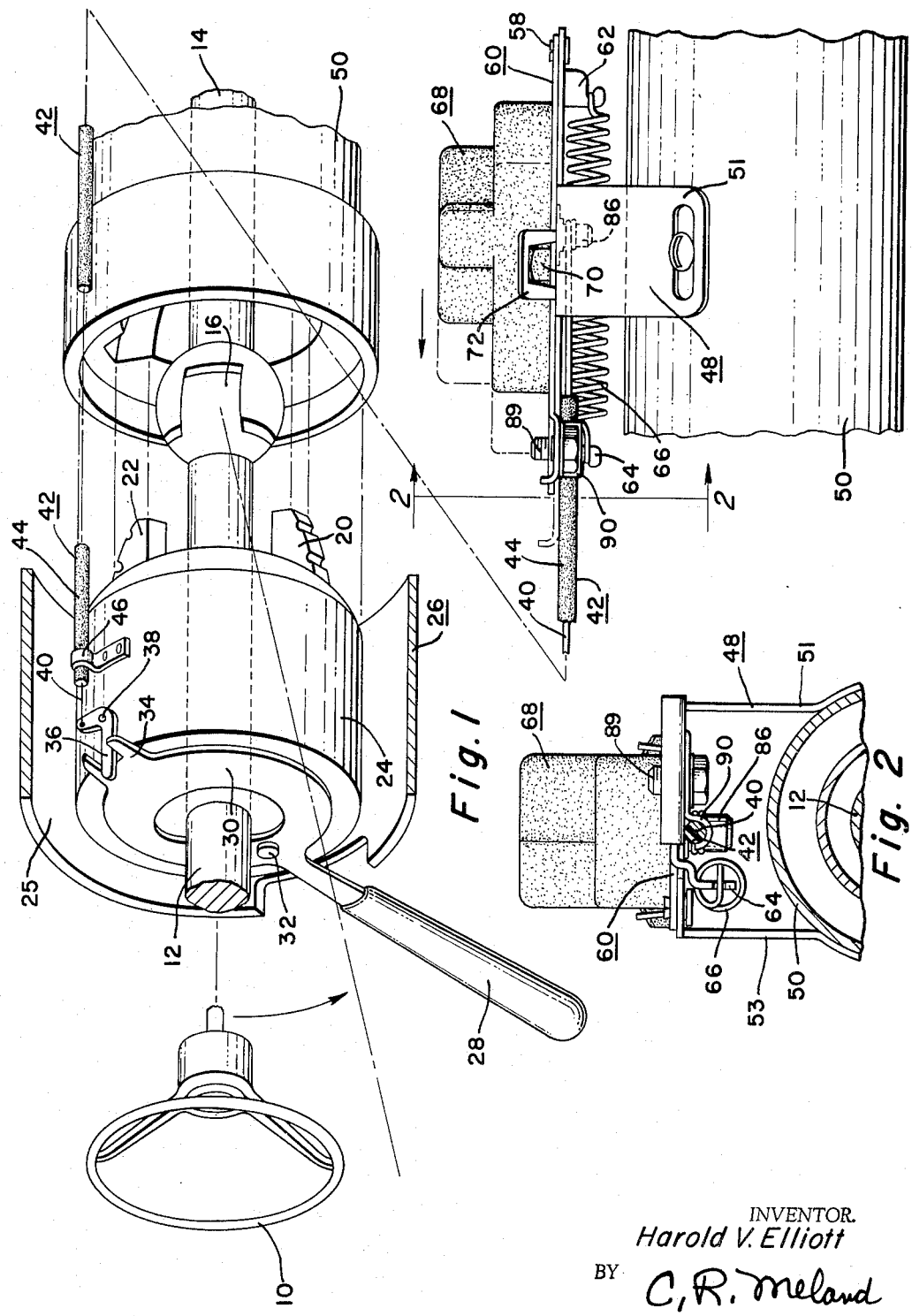

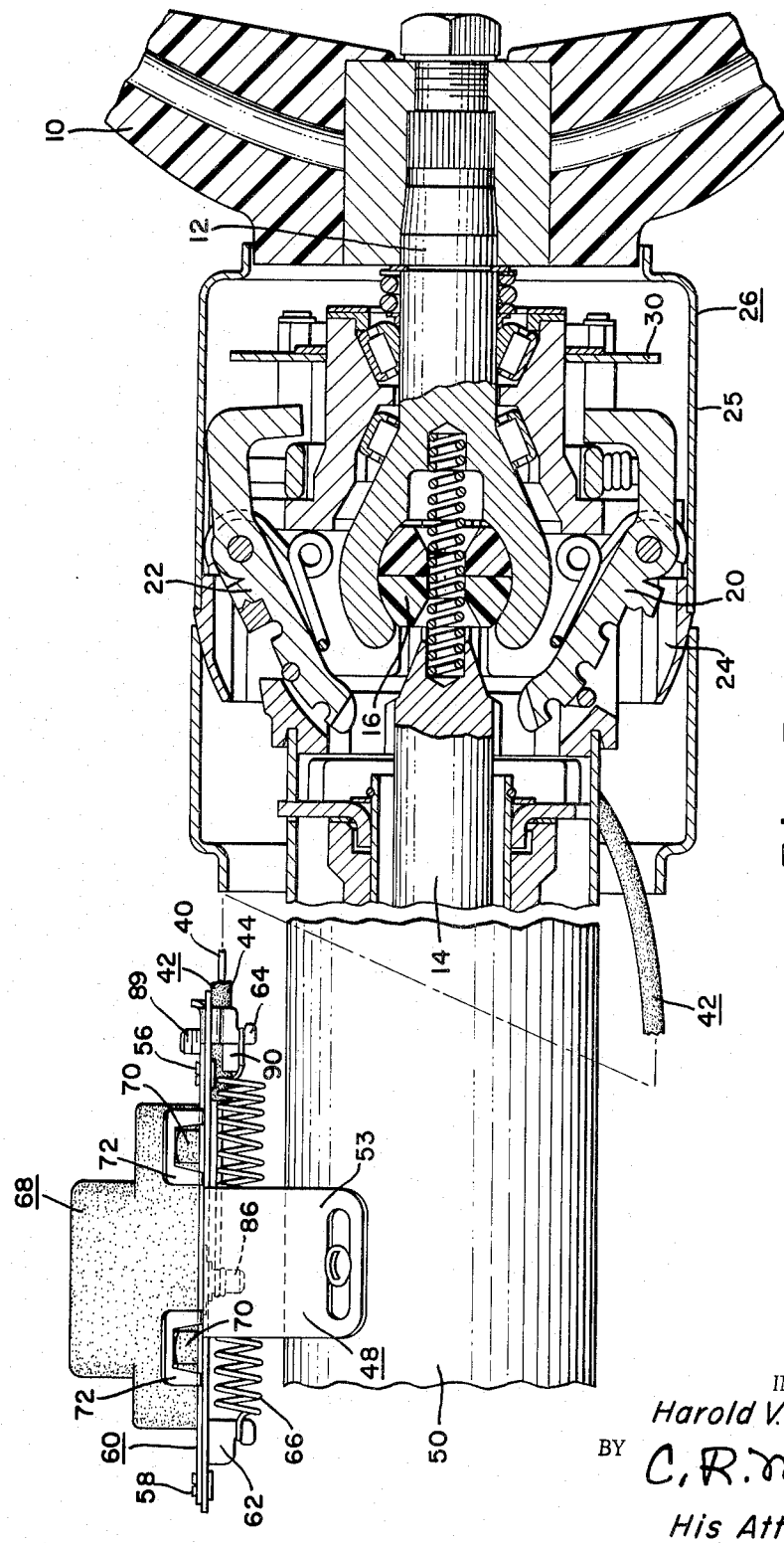

3,222,472
TURN SIGNAL SWITCH FOR A TILTABLE
STEERING WHEEL
Harold V. Elliott, Anderson, Ind., assignor to General
Motors Corporation, Detroit, Mich., a corporation of
Delaware
Filed Nov. 19, 1962, Ser. No. 238,354
7 Claims. (Cl. 200—61.27)

This invention relates to turn signal switches for energizing the direction signal lamps on a motor vehicle and more particularly to a turn signal switch that is adapted to be used on a motor vehicle that has a tiltable steering wheel.

In the past, turn signal switches have been built into the steering column assembly and in other arrangements, have been attached to a steering column mast and operated remotely by a flexible push-pull type of cable. These arrangements have performed satisfactory service in the past where the steering wheel has been permanently fixed in one position.

The present invention is concerned with actuating turn signal switches in applications where the steering wheel can be tilted to various positions.

One of the objects of this invention is to provide a switch actuating mechanism wherein a manually operable actuator is movable with a support such as a part that supports a tiltable steering wheel and wherein a switch mechanism is arranged to accommodate this movement so that the switch is not actuated by movement of the support but only by shifting of the manually operable actuator.

Another object of this invention is to provide a switch actuating mechanism wherein a manually operable actuator shifts the inner wire of a flexible push-pull cable and wherein a switching mechanism is provided which is shifted by the outer part of the cable which is connected between the switching mechanism and a movable support for the manually operable actuator.

Another object of this invention is to provide an electric switch which has a support that is adapted to be fixed and which has a housing that is shiftable relative to the support and which can be shifted when a push-pull cable is shifted. With this arrangement, the housing of the switch can carry a shiftable contact actuating member and the position of the actuating member relative to the push-pull cable can be maintained substantially constant even when the cable is shifted in its entirety.

Further objects and advantages of the present invention will be apparent from the following description, reference being had to the accompanying drawings wherein preferred embodiments of the present invention are clearly shown.

In the drawings:

FIGURE 1 is a diagrammatic exploded perspective view illustrating a turn signal switch actuating mechanism for use with a tiltable steering wheel.

FIGURE 2 is a sectional view taken along line 2—2 of FIGURE 1.

FIGURE 3 is a view partly in section of a steering column of a tiltable steering wheel arrangement and illustrating the manner in which the turn signal switch is supported from the steering column mast.

FIGURE 4 is a plan view of a turn signal switch made in accordance with this invention and shown secured to a steering column mast.

FIGURE 5 is a sectional view taken along line 5—5 of FIGURE 4.

FIGURE 6 is a plan view of the switch shown in FIGURE 4 but illustrating the opposite side of this switch from the side illustrated in FIGURE 4.

Referring now to the drawings and more particularly to FIGURE 1, the reference numeral 10 designates a steering wheel for a motor vehicle such as a passenger car. The steering wheel 10 is connected to drive a shaft 12 which is connected with a shaft 14 through joint 16. The joint 16 permits the shaft 12 to pivot relative to the shaft 14 in one plane. Thus, when this steering mechanism is mounted in a motor vehicle, the steering wheel 10 will be tiltable in a vertical plane such that the wheel can be moved toward or away from the driver along an arc of a circle.

The actual construction of the pivoting joint 16 is illustrated in greater detail in FIGURE 3. It can be seen from FIGURE 3 that a pair of pivoted latch bars 20 and 22 are provided which operate to latch the upper section of the steering column in position when the steering wheel has been tilted to the desired position by the driver of the motor vehicle. These latch bars 20 and 22 are pivoted to a part 24 which carries the housing 26. It will be appreciated that the steering wheel could be tilted in various other ways and with different latching arrangements and the present invention is directed to means for actuating the turn signal switch in a tiltable steering wheel application and this is now to be described.

For convenience of description, the upper section of the steering column is generally designated by reference numeral 26 and this section can be pivoted in a vertical plane as described hereinbefore. A turn signal lever 28 is provided which is connected with a turn signal actuating plate 30 disposed around the shaft 12. The plate 30 is pivoted on a pin 32 and has a forked portion 34 which operates a bell crank lever 36. The bell crank lever is pivoted as at 38 to the part 24 as is the pivot 32 for the actuating plate 30.

The bell crank lever 36 is connected with the actuating wire 40 of a flexible push-pull cable which is generally designated by reference numeral 42. The cable 42 has an outer tubular section 44 which slidably supports the actuating wire 40 in a manner well known to those skilled in the art. The outer portion 44 may be formed as a tube of plastic material while the slidable actuating part 40 can be a flexible wire. This cable is flexible but the outer plastic part is sufficiently rigid in its longitudinal direction to pull a switch housing as is more fully described hereinafter.

The outer portion 44 of the cable is clamped to part 24 by any suitable means such as the clamp 46. It thus is seen that as the upper end 26 of the steering mechanism is tilted, the outer section of the cable 44 will move.

The turn signal actuating plate 30 is provided with a detent mechanism which is not shown and is also provided with a cancelling mechanism that cooperates with a cancelling pin on the steering wheel 10. This has not been illustrated by the cancelling and detent mechanisms can take various forms and could be of the type shown in the patent to Redick, 2,702,327.

The turn signal switch of this invention comprises a metal support plate 48 which is secured to the steering mast jacket 50 by means of integral leg portions 51 and 53. The support plate 48 is better illustrated in FIGURE 6 and it is seen that it has a pair of slots 52 and 54 which accommodate the rivets 56 and 58. The rivets 56 and 58 are secured to another support plate 60 which is shiftable relative to the support plate 48. The support plate 48 has an outwardly struck arm 62 as does the support plate 60. The arm that is outwardly struck from the support plate 60 is designated by reference numeral 64 and it is seen that a tension spring 66 is connected between these two outwardly struck arms.

The support plate 60 carries a switch housing generally designated by reference numeral 68. This switch housing is formed of a moldable plastic insulating material and has projecting portions 70 which fit within openings formed in bent-over integral extensions 72 of the support plate 60. This serves to secure the switch housing 68 to the metal support plate 60.

The switch housing 68 carries a plurality of terminals having male terminal portions 74 and fixed contact portions 76 which are bent at right angles to the male terminal portions. The sides of the male terminal portions 74 are bent down to hold the terminals in place. The contact portions 76 cooperate with shiftable contactors 78, 80 and 82 which are carried by a contact carrier generally designated by reference numeral 84. The contact carrier is formed of a moldable plastic insulating material and has a projecting portion 86 which passes through suitable openings formed in the support plates 48 and 60. It is seen that the contact carrier 84 slides on a part of plate 60. The contacts 78, 80 and 82 are urged into engagement with the fixed contact 76 and into engagement with the wall 88 of the housing 68 by individual springs as shown. The projecting portion 86 is connected with one end of the wire actuator 40.

The shiftable support plate 60 carries a clamp 90 which is rigidly secured to the plate 60 by a bolt or screw 89 and which clamps the outer section 44 of the push-pull actuator 42 to the plate 60. It thus is seen that if the outer portion 44 of the push-pull actuator is shifted, the support plate 60 is shifted with it against the bias of the spring 66. This spring will normally bias the rivets 58 and 56 against one end of the slots 52 and 54 formed in the support plate 48.

The operation of the switch actuating mechanism of this invention will now be described in regard to situations where the steering wheel is tilted to various positions. It can be seen that when the steering wheel and the upper section 26 are tilted, the turn signal actuator 30 is tilted therewith as is the clamp 46. Since the outer section 44 of the flexible cable shifts with the upper section 26, this outer section will be moved whenever the steering wheel is tilted. When the outer section 44 of the flexible actuator 42 shifts, it will cause the support plate 60 to shift therewith. The net result of this is that the switch housing 68 and the contact carrier 84 are always adjusted relative to the fixed support plate 48 whenever the steering wheel is adjusted and the switch is therefore not actuated by tilting movement of the steering wheel. It thus can be seen that even though the steering wheel is tilted, the contact carrier 84 will be properly actuated whenever the actuating plate 30 is shifted due to movement of the bell crank lever 36 and the wire actuator 40 which is connected between the bell crank lever 36 and the projecting portion 86 of the contact carrier.

It will be appreciated that as the upper steering column mechanism 26 is tilted to move the outer section 44 of the push-pull cable, the inner wire 40 moves therewith since the actuator 30 is detented in some fixed position by detents which are not illustrated. In other words, as the outer section of the cable 44 moves during tilting of the steering wheel, the inner wire 40 moves therewith so that no inadvertent actuation of the switch can occur. The switch has no detent mechanism for contact carrier 84 but one could be provided if desired.

From the foregoing, it can be seen that a switch actuating mechanism has been provided wherein the actuator is shiftable relative to a support for the switching mechanism but wherein this shiftable movement does not affect the accuracy of actuation of the switching mechanism.

While the embodiments of the present invention as herein disclosed, constitute a preferred form, it is to be understood that other forms might be adopted.

What is claimed is as follows:

1. Turn signal switching mechanism for use with a steering mechanism of the type wherein the steering wheel is adjustable to a plurality of positions comprising, a fixed steering column, a support means for said steering wheel tiltable relative to said steering column, a manually operable actuator movable with said support means, a turn signal switch including a housing carrying at least one fixed contact, said switch having a contact carrier means, said contact carrier means movable along a predetermined path between predetermined positions relative to said housing and carrying a movable contact that engages said fixed contact in one of said positions, said switch housing being carried by said steering column and being shiftable relative thereto, a flexible motion transmitting means having an outer portion and an inner actuating portion, and means securing said outer portion to said switch housing and to said support means, said inner portion connecting said manually operable actuator and said contact carrier of said switch to move said contact carrier when said manually operable actuator is actuated.

2. A circuit controller comprising, a first plate member which is adapted to be secured in a fixed position, a second plate member carried by said first plate member and shiftable relative thereto, resilient means connected between said plate members for applying a force to said second plate member to urge it axially in one direction relative to said first plate member, a switch housing formed of moldable plastic material supported by said second plate member and forming a compartment therewith, a fixed contact carried by said switch housing, a contact carrier movable along a predetermined path and between predetermined positions in said compartment, and an electrical contact carried by said contact carrier that engages said fixed contact in one of said predetermined positions.

3. The switch mechanism according to claim 2 wherein the second plate member carries a clamp means which is adapted to clamp the outer portion of a flexible cable.

4. Switch actuating mechanism comprising, a first movable support means, a manually operably actuator supported by and movable with said first movable support means, a fixed support means which is located at a remote position from said first movable support means, a second movable support means secured to and shiftable relative to said fixed support means, circuit controlling means, said circuit controlling means including first and second contact supporting means which support cooperating electrical contacts, said first contact supporting means movable relative to said second contact supporting means along a predetermined path and between predetermined positions to provide a switching action, said electrical contacts engaging in one of said predetermined positions, said second contact supporting means carried by said second movable support means, and a flexible push-pull cable having an outer cable portion and an inner actuating member, said outer cable portion being connected between said first and second movable support means whereby the outer portion of said cable forms a force transmitting element between said first and second movable support means, said inner actuating member being connected between said first contact supporting means of said circuit controlling means and said manually operable actuator whereby said first contact supporting means is moved when said manually operable actuator is actuated.

5. Turn signal switching mechanism for use with a steering mechanism of the type wherein the steering wheel is adjustable to a plurality of positions comprising, a steering column, a support means for said steering wheel which is tiltable relative to said steering column, a manually operable actuator movable with said tiltable support means, a first support means fixed with respect to said steering column, second support means carried by and shiftable relative to said first support means, a circuit controller having first and second parts carrying cooperating contacts, said first part movable along a predetermined path and between predetermined positions relative to said second part to provide a switching action, said contacts engaging in one of said positions, said second part of said circuit controller secured to said second support means, motion transmitting means including an outer member and an inner shiftable actuating member, and means fixing said outer member to said second support means to said tiltable support means, said inner actuating member connecting said manually operable actuator and said first part of said circuit controller whereby said first part is moved when said manually operable actuator is moved to actuate said circuit controller.

6. In combination, a first movable support means, a switch actuating mechanism carried by and movable with said first movable support means, a fixed support means, a second movable support means carried by said fixed support means and shiftable relative thereto, circuit controlling means, said circuit controlling means including first contact means carried by said second movable support means and including second contact means movable relative to said first contact means along a predetermined path and between perdetermined positions to provide a switching action, said first and second contact means engaging in one of said positions, means connecting said second contact means with said switch actuating mechanism whereby said second contact means is moved when said switch actuating mechanism is actuated, and means connecting said first movable support means and said second movable support means whereby said second movable support means and said first contact means are shifted when said first movable support means is shifted.

7. A circuit controller comprising, a first plate member which is adapted to be secured in a fixed position, at least one slot formed in said first plate member, a second plate member carried by said first plate member, said second plate member being slidable relative to said first plate member and carrying a pin projecting through said slot formed in said first plate member, resilient means connected with said first and second plate members for biasing said second plate relative to said first plate member in a direction to cause said pin to engage one end of said slot, a switch housing formed of moldable plastic material supported by said second plate member and forming a compartment therewith, a fixed contact carried by said switch housing, a contact carrier movable in said compartment along a predetermined path and between predetermined positions, and an electrical contact carried by said said contact carrier engaging said fixed contact in one of said positions.

References Cited by the Examiner
UNITED STATES PATENTS 2,659,791 11/1953 Dickinson _____ 200—161
3,073,920 1/1963 Barcus _____ 200—61.27

BERNARD A. GILHEANY, *Primary Examiner.*

ROBERT K. SCHAEFER, *Examiner.*